(12) United States Patent
Mueller et al.

(10) Patent No.: US 11,472,092 B2
(45) Date of Patent: Oct. 18, 2022

(54) STERILE BLOW-MOULDING MACHINE WITH EJECTION FOR CONTAINERS

(71) Applicant: KRONES AG, Neutraubling (DE)

(72) Inventors: Holger Mueller, Pentling (DE); Juergen Soellner, Beratzhausen (DE)

(73) Assignee: KRONES AG, Neutraubling (DE)

( * ) Notice: Subject to any disclaimer, the term of this patent is extended or adjusted under 35 U.S.C. 154(b) by 441 days.

(21) Appl. No.: 15/781,592

(22) PCT Filed: Dec. 8, 2016

(86) PCT No.: PCT/EP2016/080251
§ 371 (c)(1),
(2) Date: Jun. 5, 2018

(87) PCT Pub. No.: WO2017/102539
PCT Pub. Date: Jun. 22, 2017

(65) Prior Publication Data
US 2020/0198215 A1    Jun. 25, 2020

(30) Foreign Application Priority Data
Dec. 16, 2015 (DE) ..................... 10 2015 122 025.3

(51) Int. Cl.
*B29C 49/46* (2006.01)
*B29C 49/12* (2006.01)
(Continued)

(52) U.S. Cl.
CPC .............. *B29C 49/46* (2013.01); *B29C 49/12* (2013.01); *B29C 49/36* (2013.01);
(Continued)

(58) Field of Classification Search
CPC .......... A61L 2/18; A61L 2/20; A61L 2202/23; B29C 2049/4294; B29C 2049/4679;
(Continued)

(56) References Cited

U.S. PATENT DOCUMENTS 4,174,043 A * 11/1979 Salame ............... B29C 49/0005
206/524.1
4,214,860 A *  7/1980 Kleimenhagen ........ B29C 49/12
425/149
(Continued)

FOREIGN PATENT DOCUMENTS

CN       102343665       2/2012
CN       103266787       8/2013
(Continued)

OTHER PUBLICATIONS

Chinese Office Action dated Jan. 21, 2020 issued in corresponding Chinese Application No. 2016800734394, with English translation.
(Continued)

*Primary Examiner* — Manley L Cummins, IV
(74) *Attorney, Agent, or Firm* — Onello & Mello, LLP

(57) ABSTRACT

An apparatus for forming plastic preforms into plastic containers, with a movable carrier on which at least one forming station is arranged for forming the plastic preforms, wherein the forming station is transported along a predefined transport path, and wherein the apparatus has a clean room inside which the plastic preforms are formed, wherein this clean room is isolated from a non-sterile environment by at least one wall, with a sterilisation device for sterilising the plastic preforms and/or plastic containers, which device acts upon the plastic preforms and/or plastic containers to be sterilised with a flowable sterilisation medium for their sterilisation. According to the invention, the apparatus comprises an ejection device for ejecting containers from the clean room, and this ejection device has a lock chamber from which the ejected containers can be removed, wherein this lock chamber can be acted upon with an atmosphere containing a sterilisation medium.

17 Claims, 2 Drawing Sheets

Figure 1:
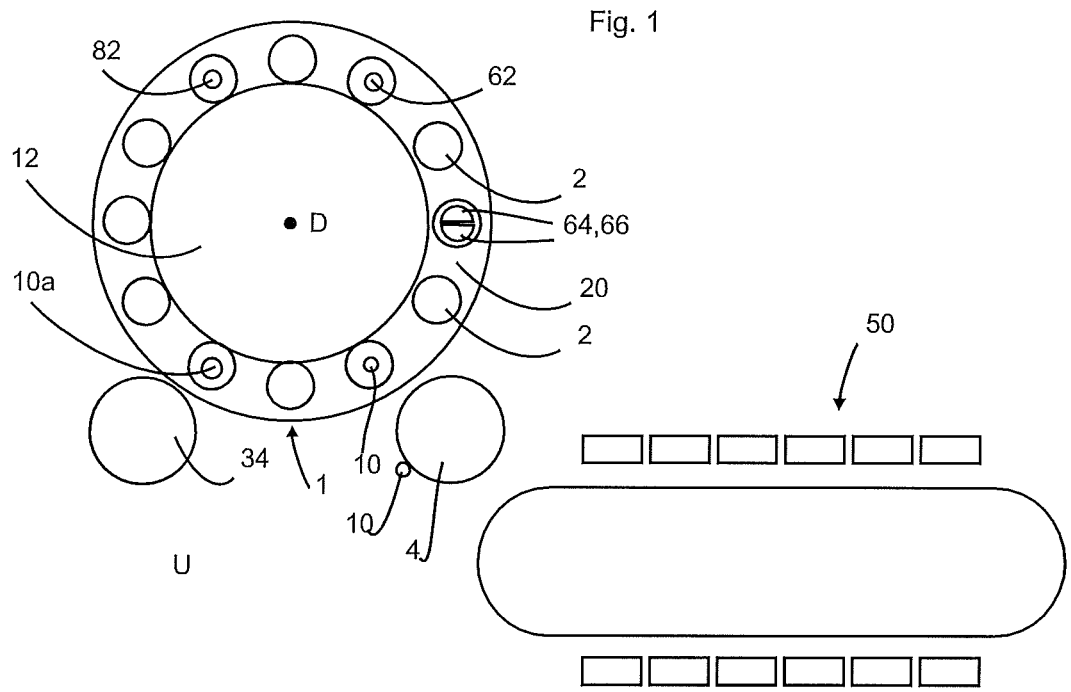

(51) Int. Cl.
    *B29C 49/36* (2006.01)
    *B29L 31/00* (2006.01)
(52) U.S. Cl.
    CPC .............. *B29C 2049/4679* (2013.01); *B29C 2049/4697* (2013.01); *B29L 2031/7158* (2013.01)
(58) Field of Classification Search
    CPC . B29C 2049/4697; B29C 49/06; B29C 49/12; B29C 49/36; B29C 49/4268; B29C 49/4284; B29C 49/46; B29C 49/4273; B29C 49/80; B29L 2031/7158; B65B 55/10; B67C 2003/227; B67C 2003/228; B67C 7/00; B67C 7/0073
    See application file for complete search history.

(56) References Cited

U.S. PATENT DOCUMENTS

| | | | |
|---|---|---|---|
| 4,880,581 A * | 11/1989 | Dastoli | B29C 49/46 264/39 |
| 7,938,639 B2 | 5/2011 | Adriansens et al. | |
| 8,770,957 B2 | 7/2014 | Laumer | |
| 8,771,584 B2 | 7/2014 | Voth | |
| 9,321,621 B2 | 4/2016 | Kitano et al. | |
| 2008/0260887 A1 | 10/2008 | Adriansens et al. | |
| 2012/0038090 A1 | 2/2012 | Voth | |
| 2012/0064189 A1* | 3/2012 | Maki | B29C 49/62 425/524 |
| 2012/0240522 A1* | 9/2012 | Wasmuht | B29C 49/786 53/396 |
| 2013/0040009 A1 | 2/2013 | Laumer | |
| 2013/0061557 A1 | 3/2013 | Kitano et al. | |
| 2016/0175466 A1* | 6/2016 | Ogawa | G21K 5/10 250/455.11 |

FOREIGN PATENT DOCUMENTS

| | | |
|---|---|---|
| EP | 1982820 | 10/2008 |
| EP | 2407417 | 1/2012 |
| EP | 2412511 | 2/2012 |
| EP | 2556943 | 2/2013 |

OTHER PUBLICATIONS

German European Search Report dated Aug. 26, 2016, issued in corresponding European Application No. 102015122025.3.
International Search Report dated Feb. 22, 2017, issued in corresponding International Application No. PCT/EP2016/080251.

* cited by examiner

STERILE BLOW-MOULDING MACHINE WITH EJECTION FOR CONTAINERS

The present invention refers to an apparatus for forming plastic preforms into plastic containers. Such apparatus have been known for a long time from the prior art. Recently, forming devices have also become known which allow such a production of plastic containers, for example blow-moulding of the plastic containers under sterile conditions. To this end, such apparatus have a clean room, inside which the forming process takes place. In a blow-moulding machine known from the prior art, the blowing module is constructed in isolator design, and is brought, for preparation, into a sterile state by means of vaporised hydrogen peroxide, during production. This sterile state must be maintained throughout the subsequent production since, before entering the blowing module, the plastic preforms are sterilised in a so-called intermediate module. To maintain this sterile state, usually a positive pressure is created in the clean room (sometimes also called an isolator) by means of ventilation systems.

The high requirements placed on this clean room and its seals towards the outside currently only allow a limited volume for containers which are ejected due to blowing defects. However, such an ejection of defective containers is advantageous since such defective containers must be prevented from reaching further modules, such as for example a filling machine. Containers which cannot be transported to the filling machines because the blowing process was unsuccessful are ejected at the outlet from the forming device, for example the blow-moulding machine, by means of a transfer star of the blowing module, and remain there until the end of production. If the volume of ejected containers exceeds the space available, in the worst case it is necessary to open the isolator or clean room. This in turn leads to premature termination of production since the sterility of the clean room has been interrupted.

The present invention is therefore based on the object of providing a possibility which avoids such production shutdowns due to a plurality of ejected containers. This object is achieved according to the invention by the subject matters of the independent claims.

Advantageous embodiments and further developments form the subject matter of the subclaims.

An apparatus according to the invention for forming plastic preforms into plastic containers has a movable carrier on which at least one forming station is arranged for forming the containers. Here, this forming station is transported along a predefined transport path, and the apparatus has a clean room, inside which the containers are formed, wherein this clean room is isolated from a non-sterile environment by at least one wall. Furthermore, the apparatus comprises a sterilisation device for sterilising the plastic preforms and/or plastic containers, which device acts upon the plastic preforms and/or plastic containers to be sterilised with a flowable sterilisation medium for their sterilisation.

According to the invention, the apparatus comprises an ejection device for ejecting containers from the clean room, and this ejection device in turn has a lock chamber from which ejected containers can be removed, wherein this lock chamber is acted upon with an atmosphere containing a sterilisation medium and/or with an in particular gaseous medium containing a sterilisation medium.

It is therefore proposed in the context of the invention that the containers are ejected from the clean room, wherein this ejection does not however lead to contamination of the clean room. The flowable medium is in particular a gaseous and/or liquid medium.

Preferably, the movable carrier is a rotatable carrier and in particular a so-called blowing wheel. Advantageously, a plurality of forming stations is arranged on this carrier, wherein each of these individual forming stations serves to form plastic preforms into plastic containers. Advantageously, the apparatus is a blow-moulding machine and in particular a so-called stretch blow-moulding machine. This means that the plastic preforms are formed by acting upon with a gaseous medium and in particular blowing air.

In a further advantageous embodiment, the individual forming stations each have blowing nozzles on which a mouth of the plastic preforms can be placed, in order to expand these. Furthermore, the individual forming stations each have so-called stretching rods which can be inserted in the plastic preforms to stretch these in the longitudinal direction. Therefore it is also conceivable that these stretching rods are guided at least partially inside said clean room. Furthermore, the individual forming stations preferably have in each case blow-moulding devices which can be opened and closed.

Here advantageously, the side parts are pivotable relative to a predefined pivot axis, in particular a pivot axis which is parallel to a longitudinal direction of the containers to be expanded.

In a further advantageous embodiment, the clean room is formed annular and in particular surrounds the transport path of the plastic preforms as a ring or torus. In a further advantageous embodiment, the apparatus comprises a discharge device for discharging formed containers, and in particular properly formed containers. Via this discharge device, the containers can be supplied to a further filling device. The above-mentioned ejection device serves in particular to eject faulty containers, i.e. containers which were produced defectively.

Thus containers may leave the clean room either via the ejection device or via the discharge device. Advantageously, the apparatus has a sealing device for sealing the clean room against the environment. This sealing device may be a so-called water lock in which a sword is guided into a circumferential (but preferably stationary arranged) channel filled with liquid.

In a further advantageous embodiment, the sterilisation device is arranged upstream of the forming device in a transport direction of the containers. This means that the plastic preforms have already been sterilised. In a further advantageous embodiment, the apparatus comprises a heating device for heating the plastic preforms. Preferably, said sterilisation device is arranged between this heating device and the forming device. This means that the plastic preforms heated by the heating device are then sterilised by the sterilisation device. As stated, the sterilisation device acts upon the plastic preforms with a sterilisation medium, such as for example hydrogen peroxide. However, other sterilisation devices are conceivable (alternatively or additionally), for example those which act upon the plastic preforms with electrons for sterilisation.

The heating device may for example be an infrared oven which preferably has a plurality of stationary arranged heating elements, past which the plastic preforms are transported.

In a further preferred embodiment, the sterilisation medium is a mixture containing $H_2O_2$ (hydrogen peroxide) and/or peracetic acid. The sterilisation medium may be a vaporous or gaseous medium.

In a further advantageous embodiment, a fluid line is provided which at least at times connects the lock chamber to the sterilisation device. In this embodiment, it is proposed that sterilisation medium occurring in the sterilisation device also serves to disinfect said lock chamber.

In this embodiment, it is assumed that a hydrogen peroxide or general sterilisation atmosphere exists in said sterilisation module or intermediate module, in particular during production. This sterilisation medium is introduced into the sterilisation module or sterilisation device for sterilising the plastic preforms. Here preferably, by means of measuring devices, for example a differential pressure measurement ($\Delta P=0$ pa) in relation to the environment, and/or regulation of this pressure for example by means of exhaust air flaps, it is ensured that the sterilisation agent atmosphere is maintained within the sterilisation device.

In this way, contamination of the heating device and/or forming device located upstream with sterilisation agent may be prevented. Preferably, an exhaust air line is provided which extracts exhaust air from the sterilisation device. This exhaust air line may be a line which constitutes or is connected to the above-mentioned fluid line. In this way, it is possible that the lock chamber is supplied with exhaust air from the sterilisation device, wherein this exhaust air contains a sterilisation medium. Here for example, a diluted sterilisation agent atmosphere may be present in this exhaust air. The proportion of the sterilisation medium in this atmosphere is preferably between 300 ppm and 5000 ppm, preferably between 1000 ppm and 4000 ppm and particularly preferably between 1500 ppm and 3000 ppm.

In a further preferred embodiment therefore, the fluid line is configured such that sterilisation medium originating from the sterilisation device can be supplied to the lock chamber. Here preferably, the concentration of the sterilisation medium lies below a level which prevails in the region of the sterilisation device. Preferably, the fluid line also serves as an exhaust air line from the sterilisation device.

In a further advantageous embodiment, the apparatus has a pump device which extracts the sterilisation agent and/or the exhaust air from the sterilisation device. This is preferably a suction pump which sucks off the exhaust air. Preferably, this pump device is also arranged downstream of the lock chamber in a flow direction of the exhaust air. In this way, the pump device extracts the exhaust air through the lock chamber.

In a further advantageous embodiment, the apparatus has a valve device which, in a first valve position, ensures that the sterilisation agent is discharged directly and in particular is not guided via the lock chamber, and which, in a second valve position, ensures that the sterilisation agent is guided via the lock chamber so that this lock chamber and/or a storage device located therein for storing plastic preforms is sterilised. Preferably therefore, a bypass device is provided which ensures that the sterilisation medium is guided past the lock chamber when desired. Here preferably, this valve device also allows intermediate positions in which some of the exhaust air is guided via the lock chamber and some of the exhaust air via the bypass.

In a further advantageous embodiment, the apparatus has a supply line which supplies sterilisation medium originating from the sterilisation device to the lock chamber, and a discharge line which discharges a gaseous medium and in particular a medium containing the sterilisation agent from the lock chamber.

Preferably, the fluid line supplies exhaust air from the sterilisation device to the lock chamber.

In a further advantageous embodiment, the apparatus comprises a receiver device which is movable relative to the clean room, for receiving containers to be ejected. This receiver device (in the following also referred to as storage device) may for example be a so-called shred trolley which can pick up the containers to be ejected. This shred trolley may for example be provided in the lock chamber and be at least partially removed for evacuating the lock chamber. Advantageously, this receiver device can also be sterilised by the sterilisation agent.

Thus it would be conceivable that during production, this receiver device is opened so that the containers can be ejected therein. In this state for example, an exhaust air flap in a main exhaust air flow from the sterilisation device may be opened. When the receiver device is filled with containers, a connection between the lock chamber and the forming device may be closed, and the receiver device can be removed, emptied and returned to the lock chamber.

Then the receiver device may be resterilised. This may be achieved in that an exhaust air flap in the main exhaust air flow closes so that the receiver device standing in the closed lock chamber is again sterilised with sterilisation agent via a bypass. After a sterilisation time, this exhaust air flap opens again. Then a connection between the lock chamber and the actual clean room may be opened again and production can be continued. It would even be conceivable here that production continues during emptying of the receiver device.

Furthermore it would be possible that the lock chamber is arranged below the above clean room and/or below the transport path of the plastic preforms. It would also be conceivable that the lock chamber is laterally offset relative to the clean room. In a further embodiment, it would be conceivable that the containers enter the lock chamber from the clean room under the effect of gravity.

In a further advantageous embodiment, a closing mechanism is provided between the lock chamber and the clean room, in order optionally to create a connection between the clean room and the lock chamber or interrupt this connection. This closing mechanism may for example be a flap, a shutter or the like. Preferably however, this closing mechanism is suitable and intended to separate the clean room and lock chamber gas-tightly from each other. Furthermore, it is also possible that this closing mechanism serves at least partially as a transport means for the containers to be ejected.

Here preferably, the lock chamber can be brought into connection with the clean room, which in particular may take place in a working mode in which containers are also ejected. In a further advantageous embodiment, the forming stations are suitable and intended for ejecting containers in the region of this closing mechanism.

In a further advantageous embodiment, the apparatus as mentioned above comprises a heating device for heating plastic preforms, and the sterilisation device is arranged between the heating device and at least one forming station.

In a further advantageous embodiment, the apparatus comprises a pressure-regulating device for maintaining a pressure of the sterilisation medium in the sterilisation device. As mentioned above, this pressure regulation should maintain the pressure at the level of an external pressure. Advantageously, the pressure should maintained at a level which is lower than an internal pressure of the clean room of the forming device.

The present invention furthermore concerns to a method for forming plastic preforms into plastic containers, wherein the plastic preforms are supplied to a plurality of forming stations arranged on a movable carrier, formed by means of these forming stations into plastic containers, and the formed plastic containers are discharged. During their formation, the plastic preforms are transported inside a clean room, and before their formation, the plastic preforms are sterilised by acting upon with a sterilisation medium by means of a sterilisation device.

According to the invention, a part of the plastic preforms or plastic containers is ejected, wherein the plastic preforms or plastic containers are ejected from the clean room into a lock chamber, and this lock chamber is at least at times acted upon with a sterilisation medium.

It is therefore also proposed according to the method that a lock chamber is provided, by means of which the plastic preforms can be ejected. Advantageously, the plastic containers to be ejected are defective and/or incorrectly produced plastic containers.

In a further preferred method, the sterilisation medium is a sterilisation medium originating from the sterilisation device. As mentioned above, this is in particular exhaust air from the sterilisation device. A bypass may thus be provided which allows this exhaust air to be supplied to the lock chamber.

With the method according to the invention, it is thus possible to eject defective containers even during on-going production. In particular, ejection is possible without the need for resterilising the clean room. Furthermore, it is possible that a so-called shred trolley—here called a receiver device—may be used to receive these containers and remove them from the lock chamber. Here again, preferably, no additional preparation of sterilisation medium is required. The sterilisation agent present in the exhaust air from the sterilisation device may be used for sterilising the receiver device.

Thus it is achieved that high mechanical and control engineering efforts are no longer necessary. By a process-given dilution of the sterilisation agent atmosphere in the exhaust air, a chemical material load on the receiver device is low but sterilisation is guaranteed. With this method, a large number of ejected containers no longer leads to premature termination of production or to a long production shutdown, in particular with subsequent sterilisation of the entire blowing module. In this way, the process reliability can be significantly increased.

Further advantages and embodiments are apparent from the appended drawings.

IN THE DRAWINGS

Figure 2:
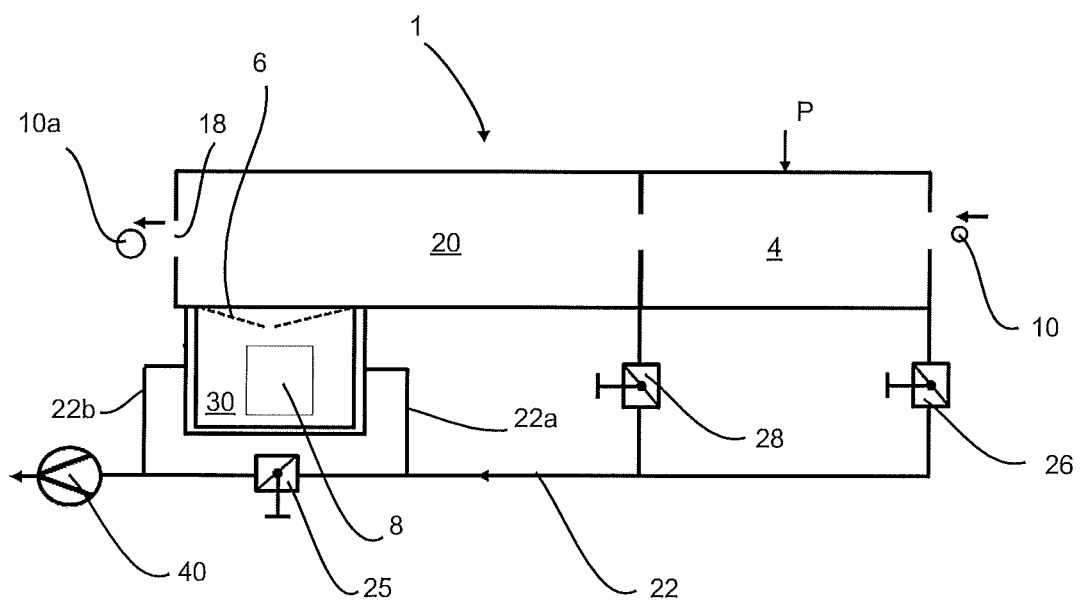
Figure 3:
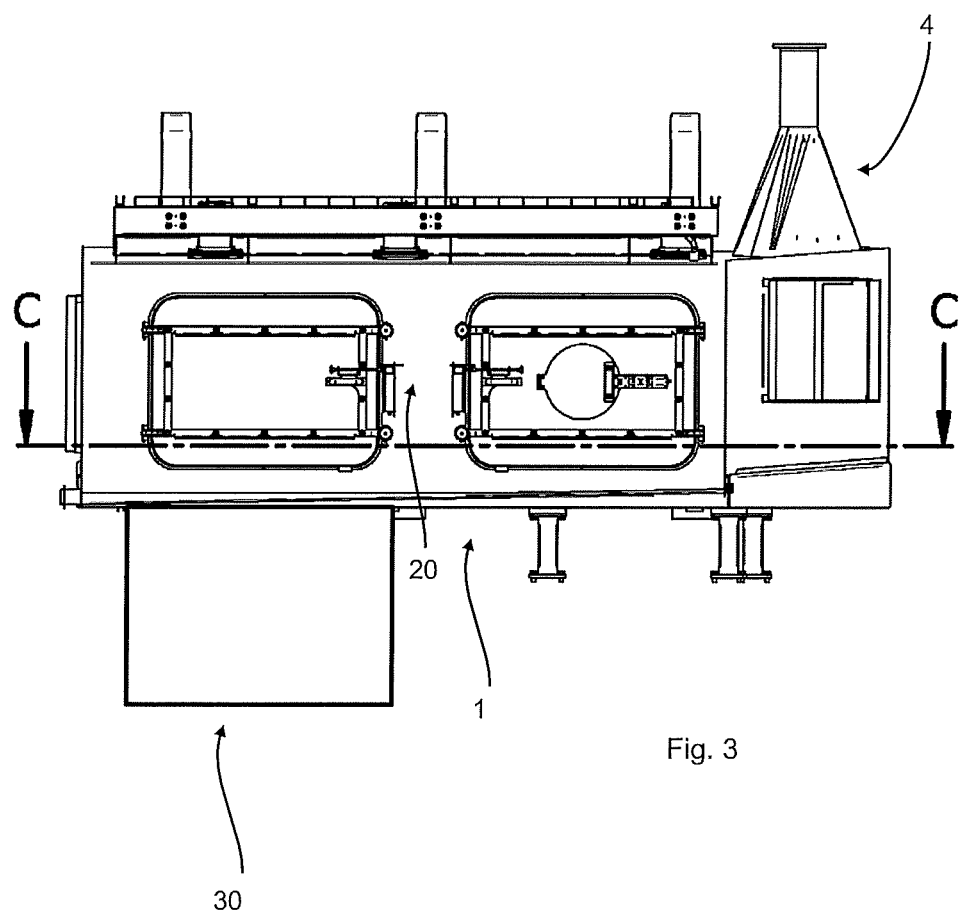

FIG. 1 a rough, diagrammatic depiction of an apparatus according to the invention for forming plastic preforms into plastic containers;

FIG. 2 a further diagrammatic depiction of an apparatus for forming plastic preforms into plastic containers, including a sterilisation device assigned thereto; and FIG. 3 a further side view of an apparatus according to the invention for forming plastic preforms into plastic containers.

FIG. 1 shows diagrammatically an apparatus 1 for forming plastic preforms into plastic containers 10a. A heating device 50 is arranged upstream of this apparatus 1 and serves to heat the plastic preforms. This heating device 50 for heating plastic preforms is followed by a sterilisation device 4, indicated merely diagrammatically, which sterilises the plastic preforms here with a flowable sterilisation medium, such as for example peracetic acid or hydrogen peroxide. It is possible that further transport means such as transport stars are arranged between the heating device 50 and the sterilisation device.

The actual forming device 1 adjoins the sterilisation device 4 and forms the plastic preforms into the plastic containers. Such transport stars for transporting the plastic preforms may also be present between the sterilisation device 4 and the forming device 1. The reference sign 20 designates a clean room inside which the plastic preforms are formed into plastic containers, and in particular plastic bottles 10a. These plastic bottles 10a are discharged via a discharge device 34, which again preferably is a transport star. This discharge device 34 may be followed by a further unit such as a filling device which fills the sterilised containers in sterile conditions.

The clean room 20 may also extend further than shown in FIG. 1, namely over the entire transport path of the containers up to a closing machine (not shown) which provides the aseptically produced and aseptically filled containers 10a with a closure. The forming device 1 has a rotatable carrier 12 on which a plurality of forming stations 2 is arranged. These forming stations here have pressurisation devices 62, indicated merely diagrammatically, (such as blowing nozzles) which act upon the plastic preforms with the gaseous medium and in particular with blowing air. In addition, the individual forming stations each comprise blow-moulding devices 64, 66 which serve to expand the plastic preforms, wherein these blow-moulding devices 64, 66 in each case have blow moulds which can be closed and opened, and in the interior of which the plastic preforms are expanded.

FIG. 2 shows a further diagrammatic depiction of an apparatus according to the invention. The plastic preforms 10 are here supplied firstly to the sterilisation device 4 and there sterilised by means of a sterilisation medium. To this end, a sterilisation medium (arrow P), for example $H_2O_2$, is supplied for sterilising the plastic preforms. From this sterilisation device 4, the plastic preforms are transported onward into the actual forming device 1. A clean room 20 is already formed in this forming device. As indicated with reference to FIG. 1, this clean room 20 is preferably configured as a channel and in particular surrounds a transport path of the plastic preforms. The aim is to make the clean room as small as possible since then only a relatively small volume need be kept sterile. In FIG. 2, the plastic preforms 10 are supplied from the right from a heating device 50 (see FIG. 1).

The reference sign 30 designates the lock chamber inside which, as mentioned above, a receiver device 8 is arranged for receiving defective plastic containers. This lock chamber 30 may be isolated from the clean room 20 via a flap mechanism 6. In a normal operating state of production, this flap element 6 is open. This flap element is thus the above-mentioned closing mechanism which serves to isolate the lock chamber 30 from the clean room 20. Preferably, this flap element may also serve as a transport means such as a chute for transporting the plastic preforms to be ejected.

Thus containers can be ejected into the receiver device 8. Exhaust air may be taken from the sterilisation device 4 via two valve devices such as valves 26, 28. In production mode, an exhaust air flap 25 in the main exhaust air flow or the fluid line 22 is opened, so that the exhaust air is discharged by means of a pump device 40 not via the lock chamber 30 but directly.

As soon as the receiver device 8 is filled with containers, the flap element 6 may be closed and hence the lock chamber 30 is separated from the clean room 20. Production may preferably be continued in this state. It would here be possible to maintain working mode during removal of the receiver device. Preferably, the clean room 20 is therefore configured such that it has a certain reception capacity for further containers to be ejected, even during removal of the containers to be ejected (i.e. while the lock chamber is isolated from the clean room).

The receiver device 8 may be removed from the lock chamber 30 and emptied, and returned to the lock chamber 30 in an empty state. In a further method step (with the flap 6 closed), the receiver device 8 is resterilised. To this end, the valve 25 in the fluid line 22 may be closed, and hence the exhaust air flow is guided via the bypass 22a, 22b to the lock chamber 30, in order in this way to sterilise the receiver device 8 standing in the closed lock chamber 30 using $H_2O_2$. After a sterilisation time, the flap device 6 opens again and production can be continued. In this case, it is not necessary to sterilise the clean room 20 again. In this way, in the most favourable case, production can be continued directly but in any case the loss of production time is kept low.

FIG. 3 shows a further depiction of the apparatus according to the invention. In this embodiment, the lock chamber 30 is arranged below the clean room 20. It would however also be possible for the lock chamber 30 to be arranged laterally next to the clean room 20. Preferably, the lock chamber 30 is arranged in a region of the forming device in which the containers have already been fully inflated. In this way, defective containers can be ejected even at a relatively late time.

The reference sign 18 in FIG. 2 designates an outlet opening of the forming device, via which the finished containers 10a can be discharged. In other words, here in principle containers can be removed from the apparatus in two ways, namely firstly via the regular outlet 18 and secondly (in the case of defective containers) via an opening of the flap device 6.

With the method described here, it is possible for the first time to use a receiver device such as a shred trolley to receive defective containers in a sterile forming device and in particular a sterile blow-moulding machine. In particular, no additional preparation of sterilisation medium is required. The sterilisation medium present in the exhaust air (in particular (preferably gaseous) $H_2O_2$) may be used for sterilising the receiver device. In this way, high 30 mechanical and control engineering efforts are no longer necessary. By the process-given dilution of the $H_2O_2$ atmosphere in the exhaust air, a chemical material load on the receiver device is low, while however sterilisation remains guaranteed. With the method described here, a large number of ejected containers does not lead to a premature termination of production or a long production shutdown with subsequent sterilisation of the entire blowing module. In this way, the process reliability of the plant is increased.

The applicant reserves the right to claim as essential to the invention all features disclosed in the application documents insofar as they are novel individually or in combination in relation to the prior art. It is furthermore pointed out that in the individual figures, features have been described which may be advantageous taken in themselves. The person skilled in the art will directly recognise that a certain feature described in one figure may also be advantageous without the use of further features from this figure. Furthermore, the skilled person will recognise that advantages may be achieved by a combination of several features indicated in individual or in different figures.

LIST OF REFERENCE SIGNS

1 Apparatus
4 Sterilisation device
6 Closing device, flap element
8 Receiver device
10 Plastic preforms
10a Plastic containers
12 Carrier
18 Outlet
20 Clean room
22 Main line
22a, 22b Bypass
26, 28 Valve device
25 Exhaust air flap
30 Lock chamber
34 Discharge device
50 Heating device
62 Pressurisation device

The invention claimed is:

1. An apparatus for forming plastic preforms into plastic containers, the apparatus comprising:
    a movable carrier on which at least one forming station is arranged for forming the plastic preforms into the plastic containers, wherein the at least one forming station is transported along a predefined transport path;
    a clean room inside which the plastic preforms are formed into the plastic containers, wherein the clean room is isolated from a non-sterile environment by at least one wall;
    a sterilisation device for sterilising the plastic preforms and/or the plastic containers, the sterilisation device acting upon the plastic preforms and/or the plastic containers with a flowable sterilisation medium;
    a lock chamber arranged below the clean room;
    an ejection device for ejecting at least one of the plastic containers from the clean room into the lock chamber during on-going production, wherein the ejected plastic containers can be removed from the lock chamber into an outer atmosphere with respect to the lock chamber during on-going production;
    a receiver device for receiving the at least one of the plastic containers ejected from the clean room, wherein the receiver device is arranged within the lock chamber during a normal operating state of production;
    a closing mechanism between the clean room and the lock chamber;
    wherein the lock chamber is configured such that as soon as the receiver device is filled with the at least one of the plastic containers ejected from the clean room, the lock chamber is isolated from the clean room via the closing mechanism while production is continued,
    wherein the lock chamber is capable of being acted upon with a gas containing a sterilisation medium, and
    wherein the apparatus is configured such that, after the lock chamber is acted upon with the gas containing the sterilisation medium, the closing mechanism opens, and
    wherein the at least one of the plastic containers ejected from the clean room enters the lock chamber from the clean room under the effect of gravity during on-going production.

2. The apparatus according to claim 1, wherein a fluid line is provided which at least at times connects the lock chamber to the sterilisation device.

3. The apparatus according to claim 2, wherein the fluid line is configured such that the flowable sterilisation medium can be supplied to the lock chamber.

4. The apparatus according to claim 2, wherein the fluid line supplies exhaust air from the sterilisation device to the lock chamber.

5. The apparatus according to claim 1, wherein the receiver device is movable relative to the clean room for receiving the at least one of the plastic containers ejected from the clean room.

6. The apparatus according to claim 2, wherein the apparatus has a heating device for heating the plastic preforms, and the sterilisation device is arranged between the heating device and the at least one forming station.

7. The apparatus according to claim 2, wherein the apparatus has a pressure control device for maintaining a pressure of the flowable sterilisation medium in the sterilisation device.

8. The apparatus according to claim 2, wherein an exhaust air line is provided which extracts exhaust air from the sterilisation device, wherein the exhaust air line is a line which constitutes or is connected to the fluid line.

9. The apparatus according to claim 1, wherein the sterilisation medium is present in exhaust air and is used for sterilising the receiver device.

10. The apparatus according to claim 1, wherein the clean room has a capacity for storing plastic containers when the lock chamber is isolated from the clean room via the closing mechanism and while production is continued.

11. The apparatus according to claim 1, wherein the closing mechanism comprises a flap element.

12. An apparatus for forming plastic preforms into plastic containers, the apparatus comprising:
 a movable carrier on which at least one forming station is arranged for forming the plastic preforms into the plastic containers, wherein the at least one forming station is transported along a predefined transport path,
 a clean room inside which the plastic preforms are formed into the plastic containers, wherein the clean room is isolated from a non-sterile environment by at least one wall;
 a sterilisation device for sterilising the plastic preforms and/or the plastic containers, the sterilisation device acting upon the plastic preforms and/or the plastic containers with a flowable sterilisation medium;
 an ejection device for ejecting at least one of the plastic preforms or at least one of the plastic containers from the clean room;
 a lock chamber for receiving the at least one plastic preforms or the at least one plastic containers ejected from the clean room, wherein the lock chamber can be acted upon with a gas containing a sterilisation medium,
 a receiver device arranged in the lock chamber, the receiver device is capable of receiving the at least one plastic preforms or the at least one plastic containers ejected from the clean room and the receiving device is movable relative to the clean room during on-going production;
 wherein the lock chamber is arranged below the clean room, and wherein the lock chamber is arranged and designed in such a way that the at least one plastic preforms or the at least one plastic containers ejected from the clean room enter the lock chamber from the clean room under the effect of gravity during on-going production.

13. The apparatus according to claim 12, wherein the receiver device is a shred trolley.

14. A method for forming plastic preforms into plastic containers, the method comprising:
 supplying the plastic preforms to a plurality of forming stations arranged on a movable carrier;
 forming the plastic preforms into the plastic containers by means of the plurality of forming stations; and
 discharging the formed plastic containers;
 wherein during formation of the plastic containers, the plastic preforms are transported within a clean room;
 wherein before formation of the plastic containers, the plastic preforms are sterilised by a sterilisation device that acts upon the plastic preforms with a sterilisation medium;
 ejecting at least one of the plastic preforms or at least one of the plastic containers from the clean room into a receiver device arranged in a lock chamber during on-going production, wherein the lock chamber is arranged below the clean room, and wherein the at least one of the plastic preforms or the at least one of the plastic containers enter the lock chamber from the clean room under the effect of gravity, wherein the clean room is at least at times acted upon with the sterilisation medium;
 isolating, while production is continued, the lock chamber from the clean room as soon as the receiver device is filled with the at least one of the plastic preforms or the at least one of the plastic containers; and
 removing the at least one of the plastic preforms or the at least one of the plastic containers from the lock chamber during on-going production via removing the receiver device from the lock chamber;
 emptying and returning the receiver device to the lock chamber;
 sterilising the emptied and returned receiver device while the lock chamber is closed; and
 after sterilising the emptied and returned receiver device, opening the lock chamber with respect to the clean room.

15. The method according to claim 14, sterilizing the lock chamber by the acting upon the locking chamber with the sterilizing medium.

16. The method according to claim 14, wherein the receiver device is movable relative to the clean room, and maintaining on-going production during removal of the receiver device from the lock chamber.

17. The method according to claim 14, wherein the receiver device is movable relative to the clean room, and the emptying of the receiver device is during the on-going production.

* * * * *